US009846462B2

(12) United States Patent
Chen et al.

(10) Patent No.: US 9,846,462 B2
(45) Date of Patent: Dec. 19, 2017

(54) THIN COOLING FAN

(71) Applicant: DELTA ELECTRONICS, INC., Guishan Townsip (TW)

(72) Inventors: Cheng-Wei Chen, Guishan Township (TW); Hsiang-Jung Huang, Guishan Township (TW)

(73) Assignee: DELTA ELECTRONICS, INC., Taoyuan (TW)

(*) Notice: Subject to any disclaimer, the term of this patent is extended or adjusted under 35 U.S.C. 154(b) by 486 days.

(21) Appl. No.: 14/314,388

(22) Filed: Jun. 25, 2014

(65) Prior Publication Data
US 2015/0301567 A1    Oct. 22, 2015

(30) Foreign Application Priority Data

Apr. 18, 2014   (CN) .......................... 2014 1 0158276

(51) Int. Cl.
*F04D 17/16*   (2006.01)
*G06F 1/20*   (2006.01)
*F04D 25/06*   (2006.01)
*F04D 29/62*   (2006.01)

(52) U.S. Cl.
CPC ............. *G06F 1/203* (2013.01); *F04D 17/16* (2013.01); *F04D 25/0613* (2013.01); *F04D 29/626* (2013.01)

(58) Field of Classification Search
CPC ................. F04D 17/16; F04D 29/626; F04D 25/0613–25/646; F04D 29/4226; G06F 1/203
See application file for complete search history.

(56) References Cited

U.S. PATENT DOCUMENTS

| 4,818,907 A * | 4/1989 | Shirotori | G11B 19/2009 310/67 R |
| 2011/0149511 A1* | 6/2011 | Zhang | F04D 29/4226 361/695 |
| 2013/0164158 A1* | 6/2013 | Matsuba | F04D 17/16 417/410.1 |
| 2013/0323093 A1* | 12/2013 | Tamaoka | F04D 25/0613 417/354 |

* cited by examiner

*Primary Examiner* — Peter J Bertheaud
*Assistant Examiner* — Dnyanesh Kasture
(74) *Attorney, Agent, or Firm* — Hauptman Ham, LLP

(57) ABSTRACT

A thin cooling fan (1) includes a fan shell (10), a motor (20), a plurality of blades (30), and a PCB (40). The fan shell (10) comprises a base plate (11) and a shell cover (12) which cover to each other to form an inner space (100). The base plate (11) has a first surface (111) facing toward the inner space (100) and a second surface (112) having a receiving space (101) and opposite to the first surface (111). The motor (20) is combined in the inner space (100). The blades (30) are disposed in the inner space (100) and rotated by the motor (20). The PCB (40) is disposed in the receiving space (101) and flush with the second surface (112). Thus, the whole thickness of the cooling fan (1) is reduced and the flow channel design in the inner space (100) is not affected.

9 Claims, 5 Drawing Sheets

THIN COOLING FAN

BACKGROUND OF THE INVENTION

Field of the Invention

The present invention relates to a cooling fan and, in particular, to a structure of a thin cooling fan.

Description of Related Art

Recently the light and handy tablet computer has become very popular and the notebook computer also gradually follows a slim design. However, the inner space of the computer decreases accordingly as the slim design of the computer main unit is used. To this end, how to arrange and design an effective cooling fan in such a limited inner space inside the computer to dissipate the heat generated by the operating electronic devices for a normal operation is a critically important issue.

Moreover, the assembly methods of the PCB (Printed Circuit Board) of the existing cooling fan can be roughly divided into two types, general assembly and plate attachment assembly. For the general assembly, the stator winding of the motor is firstly soldered on the PCB; then the stator winding and the PCB are assembled to the fan shaft. The plate attachment assembly is designed for the thin cooling fan, in which the PCB is firstly attached in the fan and then the stator winding of the motor is fixed to the fan shaft and finally the soldering between the stator winding and the PCB is performed.

In the above two assembly methods of the PCB of the cooling fan, the plate attachment assembly has better utilization of the inner space of the fan, which can reduce the whole thickness of the cooling fan. However, since the electronic devices on the PCB and the PBC itself will affect the flow design inside the fan and especially their heights occupy certain spaces inside the fan, hindering the thinning of the cooling fan.

In view of foregoing, the inventor pays special attention to research with the application of related theory to propose the cooling fan of the present invention, a reasonable design, to overcome the above disadvantages regarding the above related art.

SUMMARY OF THE INVENTION

It is an objective of the present invention to provide a thin cooling fan, in which a receiving space is disposed outside a base plate and a PCB is attached in the receiving space such that the PCB and the base plate overlap partially to achieve the thinning of the cooling fan.

It is another objective of the present invention to provide a thin cooling fan, in which the disposition of a hollow portion of the base plate moves blades closer to the base plate to further reduce the whole height of the fan.

It is yet another objective of the present invention to provide a thin cooling fan, in which the PCB is attached outside the base plate, thereby simplifying the assembly to improve the assembly efficiency and yield rate.

To achieve the above objectives, the present invention provides a thin cooling fan which comprises a fan shell, a motor, a plurality of blades, and a PCB. The fan shell comprises a base plate and a shell cover. The base plate and the shell cover cover to each other to form an inner space. The base plate has a first surface facing toward the inner space and a second surface opposite to the first surface. The second surface has a receiving space. The motor is combined in the inner space. The blades are disposed in the inner space and driven by the motor to rotate. The PCB is disposed in the receiving space and flush with the second surface.

In an embodiment of the present invention, the motor comprises a stator structure and a rotor structure disposed correspondingly outside the stator structure.

To achieve the above objectives, the present invention provides a thin cooling fan which comprises a fan shell, a motor, a plurality of blades, and a PCB. The fan shell comprises a base plate and a shell cover. The base plate and the shell cover cover to each other to form an inner space. The base plate has a first surface facing toward the inner space and a second surface opposite to the first surface. The second surface has a receiving space. The motor is combined in the inner space. The blades are disposed in the inner space and driven by the motor to rotate. The PCB is disposed in the receiving space and flush with the second surface. The receiving space comprises a first receiving space disposed corresponding to the position of the stator structure, a second receiving space disposed correspondingly outside the positions of the blades, and a third receiving space disposed between the outside of the stator structure and the inside of the blades. In an embodiment of the present invention, the receiving space comprises a first receiving space disposed corresponding to the position of the stator structure and a second receiving space disposed correspondingly outside the positions of the blades.

In an embodiment of the present invention, the first receiving space comprises a first recess portion and a plurality of first hollow portions spaced apart. The PCB comprises a first substrate disposed corresponding to the stator structure and a plurality of first solder points spaced apart on the first substrate. The first substrate is attached to the first recess portion. The first solder points are respectively and correspondingly disposed in the first hollow portions.

In an embodiment of the present invention, the second receiving space comprises a second recess portion and a second hollow portion. The PCB comprises a second substrate disposed correspondingly outside the positions of the blades and a plurality of second solder points spaced apart on the second substrate attached to the second recess portion. The second solder points are disposed in the second hollow portion.

In an embodiment of the present invention, the receiving space further comprises a third receiving space disposed between the outside of the stator structure and the inside of the blades.

In an embodiment of the present invention, the third receiving space comprises a third hollow portion. The PCB comprises a third substrate disposed correspondingly between the outside of the stator structure and the inside of the blades. The third substrate is disposed in the third hollow portion.

Compared with the existing technology, the cooling fan of the present invention has the hollow portion disposed on the base plate; the PCB is combined with the base plate externally to cover the hollow portion correspondingly. Thus, the whole thickness of the thin cooling fan is reduced and the flow channel design in the inner space of the fan is not affected by the disposition of the PCB. Further, the PCB is combined with the fan externally, which can enhance the convenience of assembly.

DETAILED DESCRIPTION OF THE INVENTION

The detailed description and technical details of the present invention will be explained below with reference to accompanying figures. However, the accompanying figures are only for reference and explanation, but not to limit the scope of the present invention.

Figure 1:
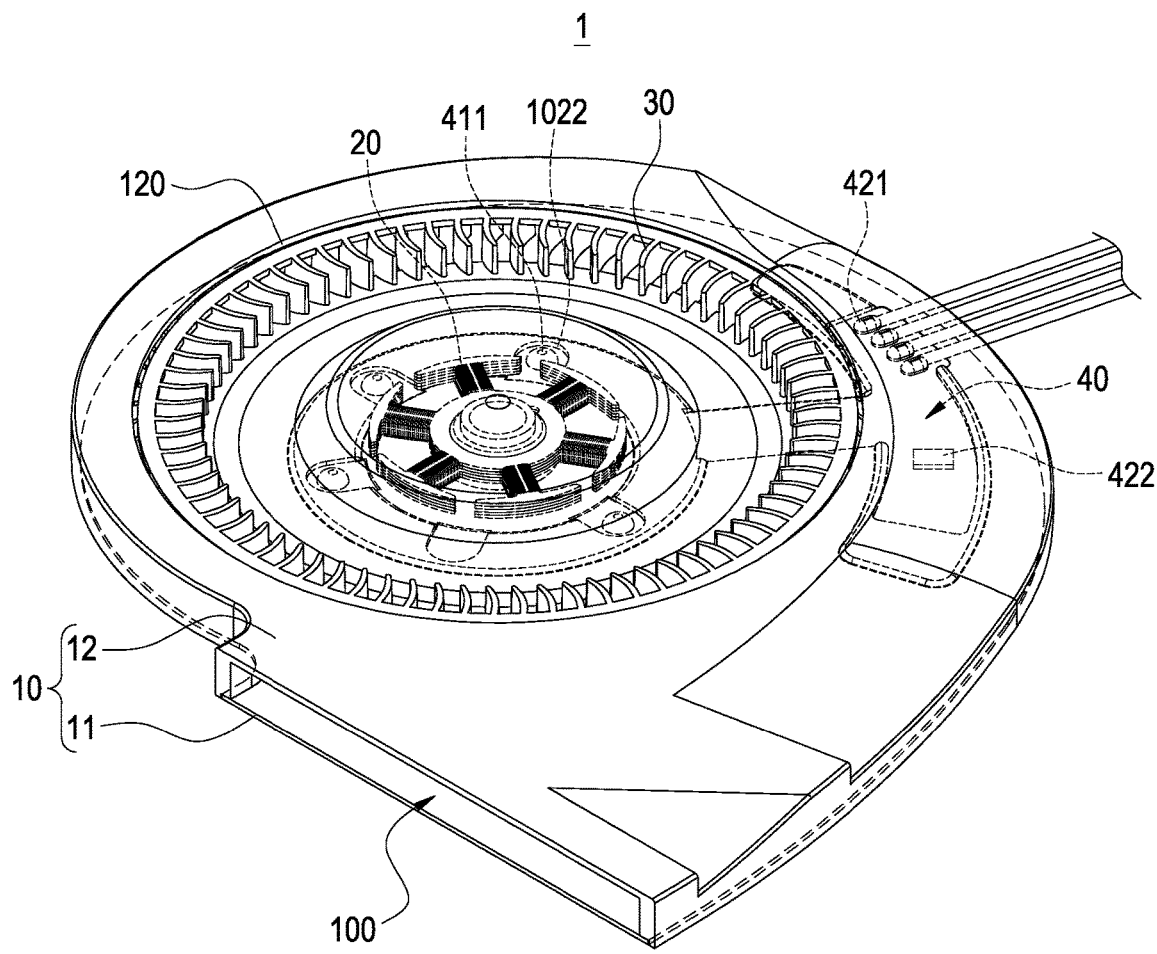
FIG. 1 is a top perspective view of the thin cooling fan of the present invention.
Figure 2:
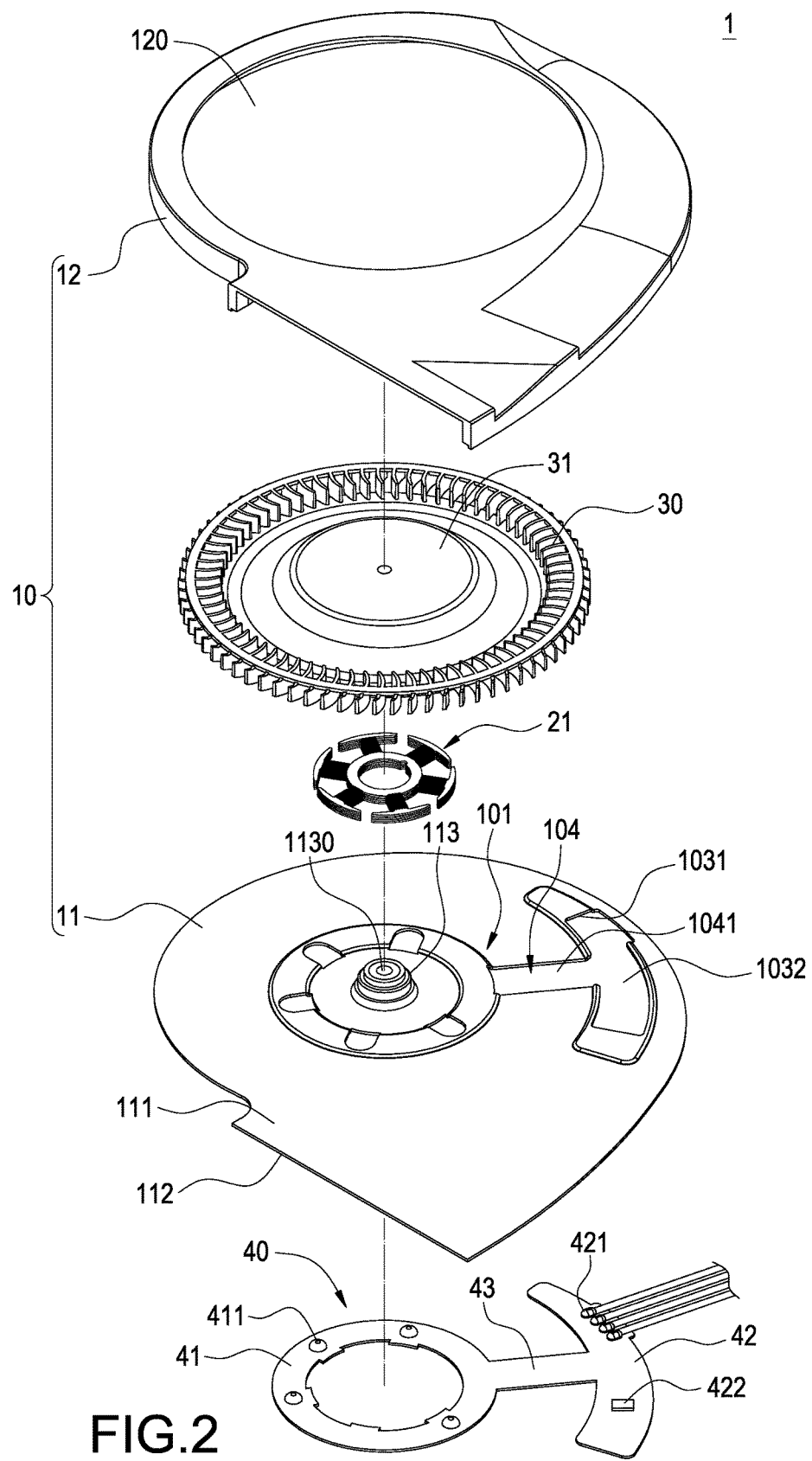
FIG. 2 is an exploded perspective view of the thin cooling fan of the present invention.
Figure 3:
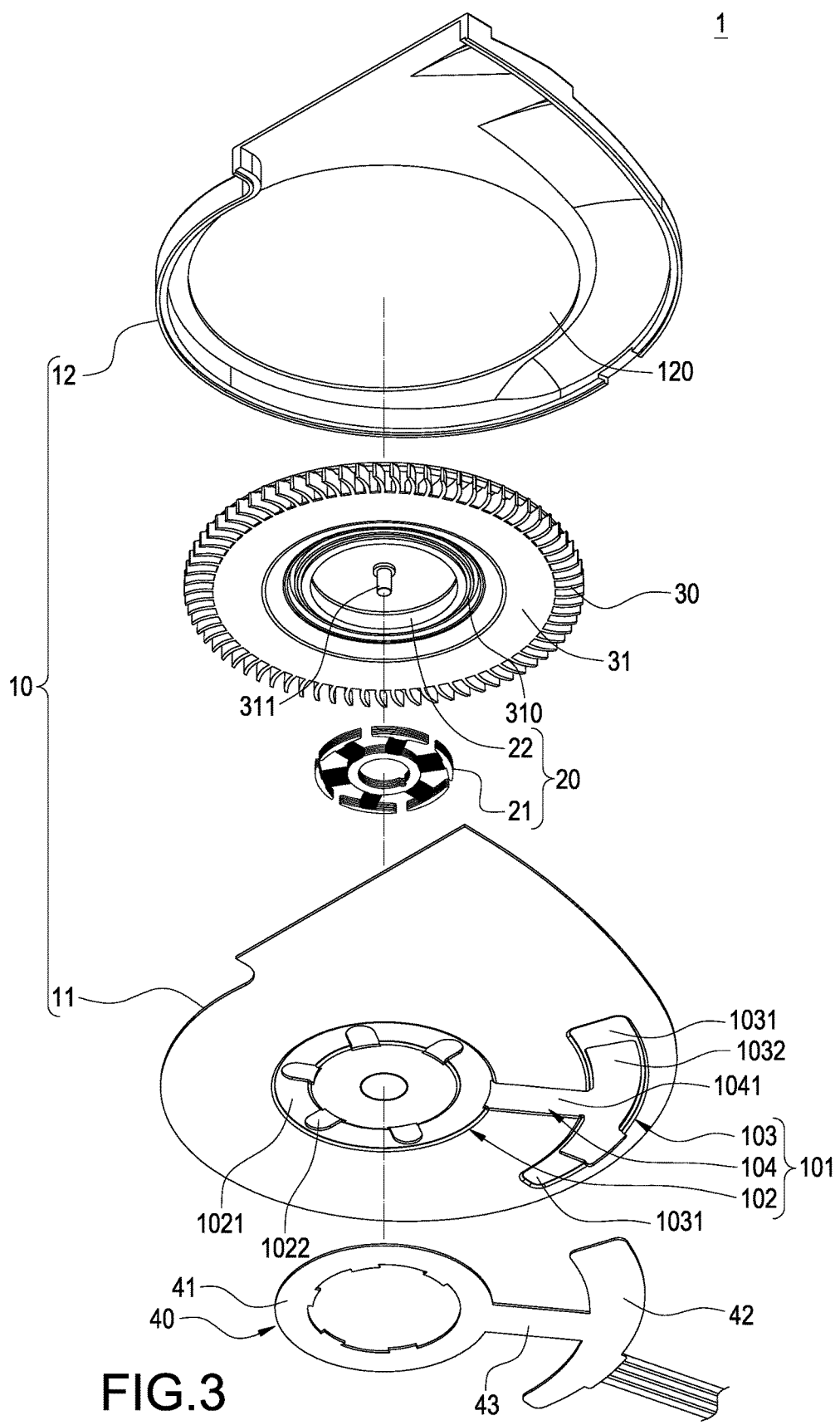
FIG. 3 is another exploded perspective view of the thin cooling fan of the present invention.

Please refer to FIGS. 1-3, which are a top perspective view and two exploded perspective views of the thin cooling fan of the present invention. The present invention provides a thin cooling fan 1 which comprises a fan shell 10, a motor 20, a plurality of blades 30, and a PCB 40. The motor 20 is combined in the inner space 100 to drive the blades 30 to rotate. The PCB 40 is used to control the operation of the motor 20.

The fan shell 10 comprises a base plate 11 and a shell cover 12. The base plate 11 and the shell cover 12 cover to each other to form an inner space 100. Also, the base plate 11 has a first surface 111 facing toward the inner space 100 and a second surface 112 opposite to the first surface 111. The second surface 112 of the base plate 11 conforms to the outline of the PCB 40 and has a receiving space 101.

The motor 20 is combined in the inner space 100. In the current embodiment, a shaft post 113 is formed on the first surface 111 of the base plate 11; the motor 20 is disposed axially on the shaft post 113. In more detail, the motor 20 comprises a stator structure 21 sleeved around the shaft post 113 and a rotor structure 22 disposed correspondingly outside the stator structure 21.

Moreover, plural blades 30 are disposed in the inner space 100 and driven by the motor 20 to rotate. Preferably, the blades 30 are combined around the perimeter of a hub 31; the rotor structure 22 is combined to the hub 31. Also, in an embodiment of the present invention, the hub 31 is formed with an annular slot 310, as shown in FIG. 3. The rotor structure 22 is composed of magnets disposed inside the annular slot 310. The shaft post 113 has an axis hole 1130. A projecting shaft 311 is disposed correspondingly on the hub 31 and disposed into the axis hole 1130.

The form of the PCB 40 is unlimited. The PCB 40 may be a rigid PCB (RPC) made of FR-4, or a flexible PCB (FPC) made of polymide film (PI film) or Poly(ethylene terephthalae) (PET film). The PCB 40 is disposed in the receiving space 101 and flush with the second surface 112. Further, the attachment between the PCB 40 and the receiving space 101 is formed by a backing adhesive (not shown). In the current embodiment, the receiving space 101 comprises a first receiving space 102 disposed corresponding to the position of the stator structure 21 and a second receiving space 103 disposed correspondingly outside the positions of the blades 30.

In more detail, the first receiving space 102 comprises a first recess portion 1021 and a plurality of first hollow portions 1022 spaced apart. The PCB 40 comprises a first substrate 41 disposed corresponding to the stator structure 21 and a plurality of first solder points 411 spaced apart on the first substrate 41. The first substrate 41 is attached to the first recess portion 1021. The first solder points 411 are disposed respectively and correspondingly in the first hollow portions 1022.

In addition, the second receiving space 103 comprises a second recess portion 1031 and a second hollow portion 1032. The PCB 40 comprises a second substrate 42 disposed correspondingly outside the positions of the blades 30, a second solder point 421 disposed on the second substrate 42, and an electronic device 422. The second substrate 42 is attached in the second recess portion 1031 and is connected to the first substrate 41; the second solder point 421 is disposed in the second hollow portion 1032. In this way, the whole thickness of the cooling fan 1 can be reduced. In the current embodiment, there are plural second solder points 421. The second receiving space 103 comprises two second recess portions 1031 disposed symmetrically. The second hollow portion 1032 is located between the two second recess portions 1031.

Preferably, when the PCB 40 is fixed to the base plate 11, the distance from the electronic device 422 and the second solder points 421 to the edge of the base plate 11 is greater than 0.3 mm, but not limited to this when implementation of the present invention. Note that when the second solder points 421 are disposed at the edge of the base plate 11, the base plate 11 has to be provided correspondingly with a hollow portion that is then covered by the PCB 40, preventing the PCB 40 from occupying the flow space inside the fan.

Moreover, the receiving space 101 further comprises a third receiving space 104 disposed between the outside of the stator structure 21 and the inside of the blades 30. The third receiving space 104 comprises a third hollow portion 1041. The PCB 40 comprises a third substrate 43 disposed correspondingly between the outside of the stator structure 21 and the inside of the blades 30. The third substrate 43 is disposed in the third hollow portion 1041.

Figure 4:
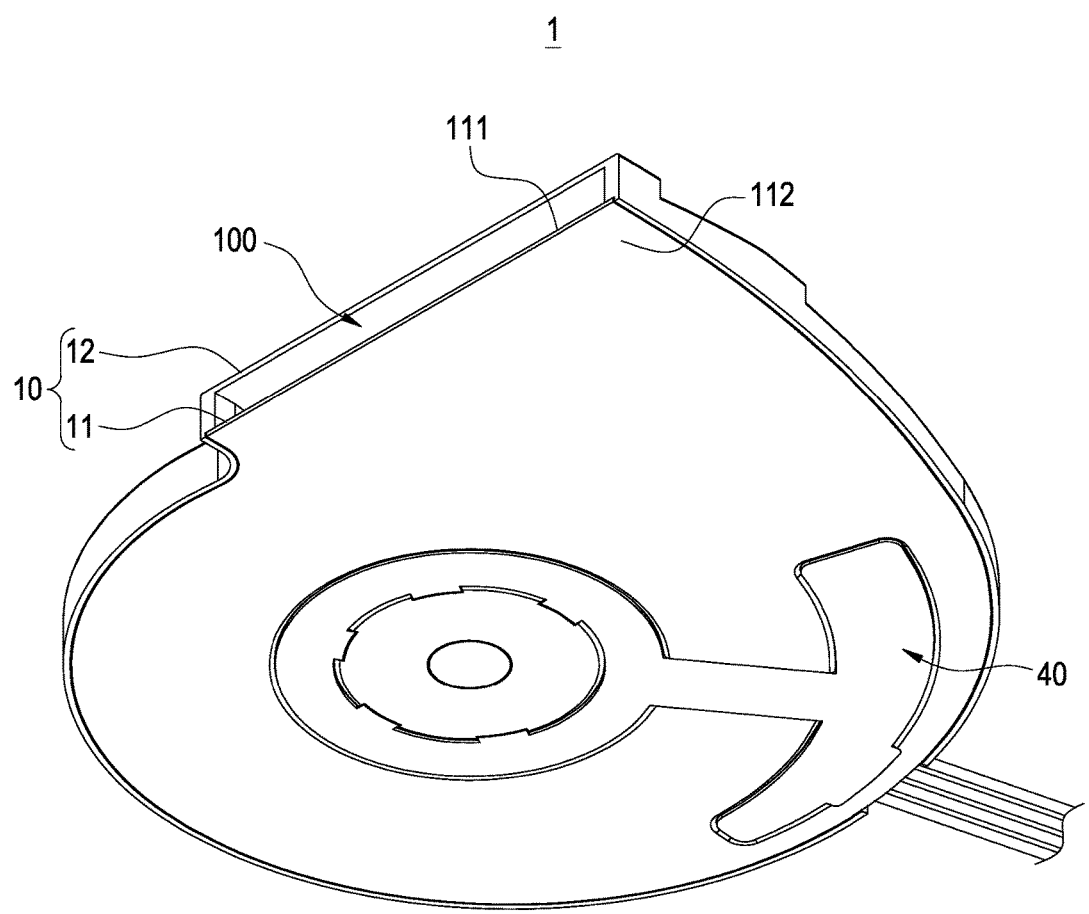
FIG. 4 is a bottom perspective view of the thin cooling fan of the present invention.
Figure 5:
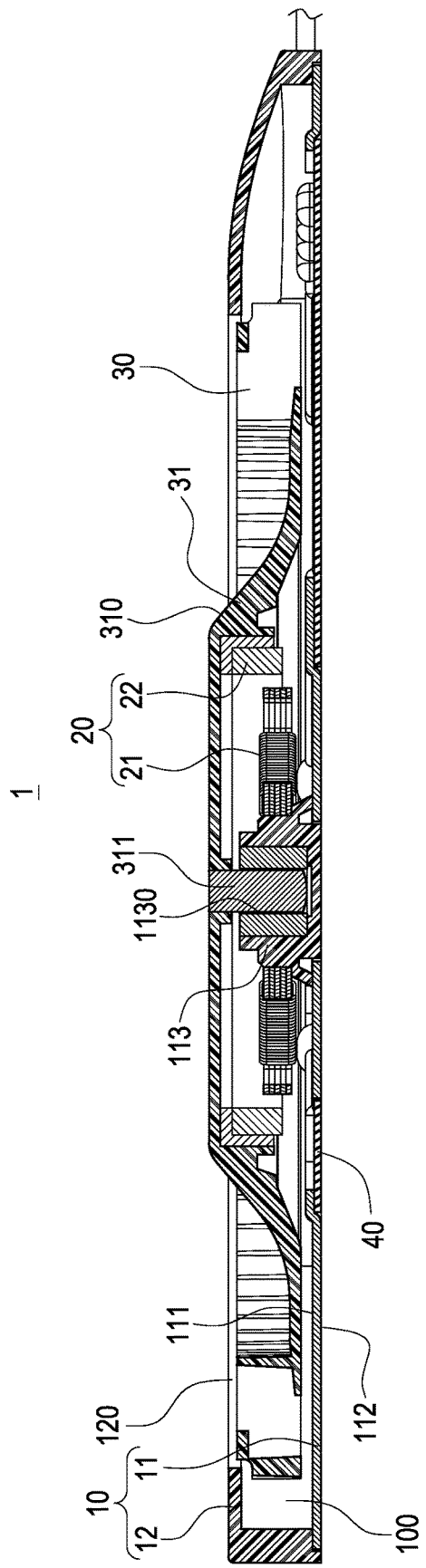
FIG. 5 is an assembled cross-sectional view of the thin cooling fan of the present invention.

Please refer to FIGS. 4 and 5, which are a bottom perspective view and an assembled cross-sectional view of the thin cooling fan of the present invention, respectively. The PCB 40 of the cooling fan 1 of the present invention is combined with the base plate 11 externally to be disposed in the receiving space 101 and is attached to the base plate 11 using the backing adhesive. Note carefully that a side surface of the PCB 40 is flush with the second surface 112.

With an electrical connection between the PCB 40 and the stator structure 21, when the cooling fan 1 rotates, the electromagnetic effect induced between the stator structure 21 and the rotor structure 22 will drive and rotate the rotor structure 22. Consequently, the blades 30 coupled to the rotor structure 22 will rotate to generate the air flow through which the heat is dissipated.

Note that, in the current embodiment, the shell cover 12 is provided with an opening 120. The blades 30 and the hub 31 are protruded and exposed in the opening 120. Thus, the whole height of the cooling fan 1 is further reduced.

The embodiments described above are only preferred ones of the present invention and not to limit the scope of appending claims regarding the present invention. Therefore, all the equivalent modifications applying the spirit of the present invention should be embraced by the scope of the appending claims of the present invention.

What is claimed is:

1. A thin cooling fan, comprising:
   a fan shell comprising a base plate and a shell cover, wherein the base plate and the shell cover are combined with each other to form an inner space, the base plate has a first surface facing the inner space and a second surface opposite to the first surface, the second surface has a receiving region comprising a recess region and a hollow region, the recess region includes a first recess portion and a second recess portion, the hollow region includes a first hollow portion and a second hollow portion, the first recess portion and the first hollow portion are configured as a first receiving space, and the second recess portion and the second hollow portion are configured as a second receiving space;

a motor installed in the inner space;

a plurality of blades disposed in the inner space and driven by the motor, the blades extending in a radial direction, and the second receiving space located outside ends of the blades along the radial direction; and a printed circuit board (PCB) disposed in the receiving region, the PCB having a side surface flush with the second surface, wherein
the PCB comprises a first substrate and a first solder point disposed on the first substrate, a second substrate and a second solder point disposed on the second substrate,
the first substrate is attached to the first recess portion,
the first solder point is disposed in the first hollow portion,
the second substrate is attached to the second recess portion, and
the second solder point is disposed in the second hollow portion.

2. The thin cooling fan according to claim 1, wherein the motor comprises a stator structure and a rotor structure outside the stator structure.

3. The thin cooling fan according to claim 2, wherein the first receiving space is disposed corresponding to the position of the stator structure.

4. The thin cooling fan according to claim 2, wherein the second receiving space is disposed outside the blades.

5. The thin cooling fan according to claim 4, wherein the second substrate is disposed outside the blades.

6. The thin cooling fan according to claim 2, wherein the receiving region further comprises a third receiving space disposed between the stator structure and the blades.

7. The thin cooling fan according to claim 3, wherein the receiving region comprises a third receiving space disposed between the stator structure and the blades.

8. The thin cooling fan according to claim 6, wherein the third receiving space comprises a third hollow portion, wherein the PCB comprises a third substrate disposed correspondingly between the stator structure and the blades, wherein the third substrate is disposed in the third hollow portion.

9. A thin cooling fan, comprising:
a fan shell comprising a base plate and a shell cover, wherein the base plate and the shell cover are combined with each other to form an inner space, the base plate has a first surface facing the inner space and a second surface opposite to the first surface, and the second surface has a receiving region;

a motor installed in the inner space, the motor comprising a stator structure and a rotor structure outside the stator structure;

a plurality of blades disposed in the inner space and driven by the motor the blades extending in a radial direction, and the second receiving space located outside ends of the blades along the radial direction; and a printed circuit board (PCB) disposed in the receiving region, the PCB having a side surface flush with the second surface, wherein
the PCB comprises a first substrate, a first solder point disposed on the first substrate, a second substrate, and a second solder point disposed on the second substrate and a third substrate,
the receiving region comprises a first receiving space disposed corresponding to the position of the stator structure, a second receiving space disposed correspondingly outside the blades, and a third receiving space disposed between the outside of the stator structure and the inside of the blades,
the first receiving space includes a first recess portion and a first hollow portion,
the second receiving space includes a second recess portion and a second hollow portion,
the third receiving space includes a third hollow portion,
the first substrate is attached to the first recess portion,
the first solder point is disposed in the first hollow portion,
the second substrate is attached to the second recess portion,
the second solder point is disposed in the second hollow portion, and
the third substrate is disposed in the third hollow portion.

* * * * *